United States Patent Office 3,370,003
Patented Feb. 20, 1968

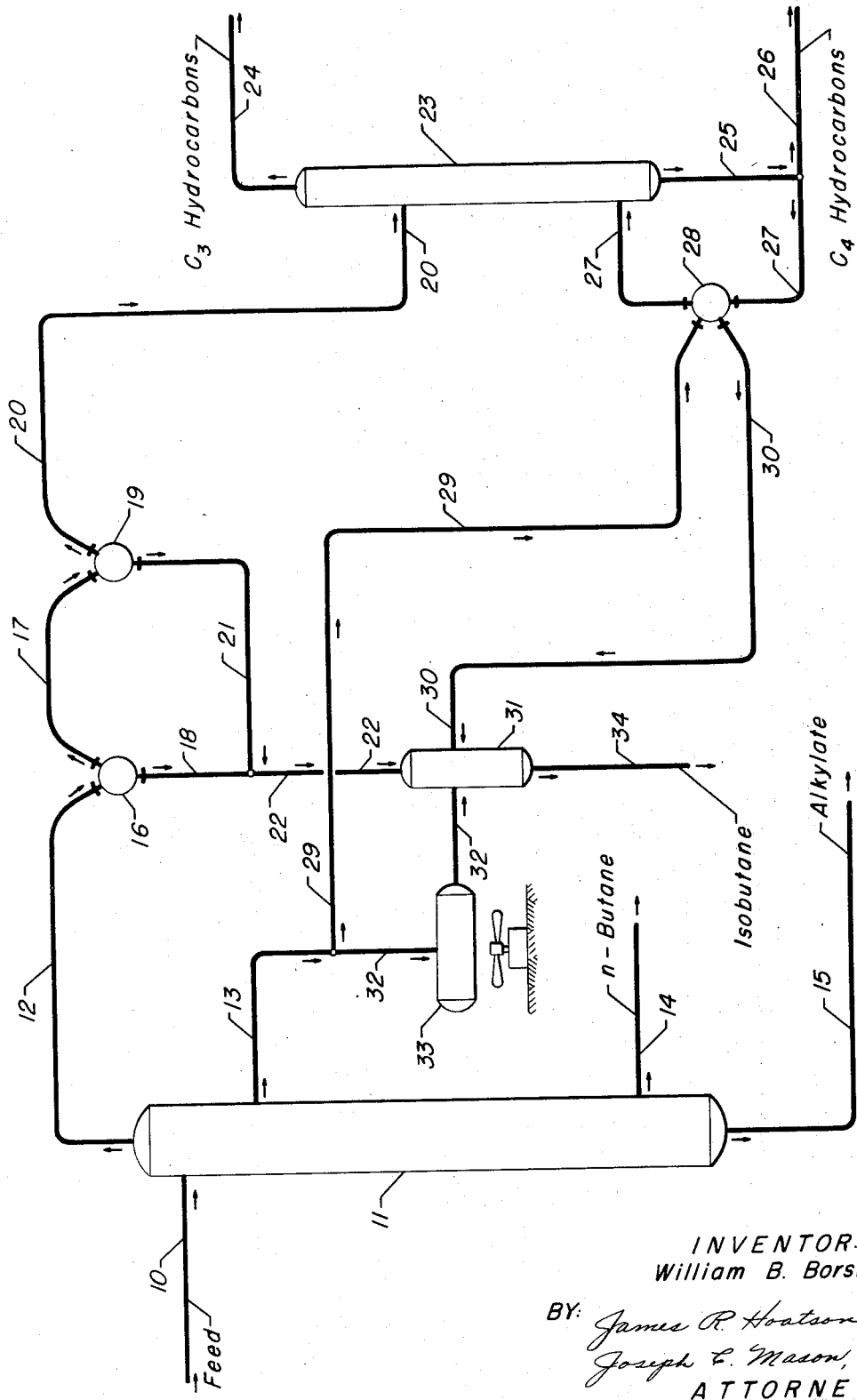

3,370,003
METHOD FOR SEPARATING LIGHT
HYDROCARBON COMPONENTS
William B. Borst, Jr., Mount Prospect, Ill., assignor to Universal Oil Products Company, Des Plaines, Ill., a corporation of Delaware
Filed Dec. 27, 1966, Ser. No. 604,983
6 Claims. (Cl. 208—351)

ABSTRACT OF THE DISCLOSURE

Method for separating a feed mixture comprising $C_3$ hydrocarbons, isobutane, and alkylate utilizing fractionation means wherein the overhead fraction from a first distillation column is partially condensed prior to introduction into a second distillation column and wherein a vapor side-cut fraction removed from the first distillation column is used as the heat source in the reboiler means associated with the second distillation column. The invention is applicable specifically to the separation of the hydrocarbon effluent from a $C_4$ catalytic alkylation reaction zone. The desired product comprises alkylate suitable for use as a gasoline blending stock.

---

This invention relates to a fractionation scheme. It also relates to a method for separating light hydrocarbon components. It particularly relates to a method for separating normally gaseous hydrocarbons from the hydrocarbon effluent of an isoparaffin-olefin hydrocarbon alkylation process. The invention specifically relates to a method for enriching the feed to a depropanizing column operating in conjunction with an isobutane stripping column.

It is well known in the prior art that catalytic alkylation using a catalyst such as hydrofluoric acid or sulfuric acid has become an important chemical tool for preparing alkylated hydrocarbons and derivatives thereof. The commercial and industrial demand for these products is exemplified by the demand for isoparaffin hydrocarbons and alkyl-substituted benzenes of gasoline boiling range and the demand for alkyl-substituted aromatic hydrocarbons suitable for conversion to surfactants, e.g. detergents, wetting agents, etc. The prior art processes of alkylation generally are effected by contacting an isoparaffin hydrocarbon feed stock with an olefin hydrocarbon in the presence of a catalyst such as hydrofluoric acid in a typical reaction vessel for conducting chemical reactions.

The catalytic alkylation process to which the present invention is especially applicable consists of a process in which a mixture of hydrocarbons containing isoparaffins such as isobutane, isopentane, and the like; and olefin hydrocarbons such as propylenes, butylenes, isobutenes, amylenes, and the like, are mixed intimately in the presence of a strong acid catalyst such as hydrofluoric acid or sulfuric acid at generally room temperatures or lower for sufficient time to complete the reaction. The effluent from the reaction zone contains isoparaffin hydrocarbons of higher molecular weight than the isoparaffin in the original mixture. For convenience purposes as used herein the term "alkylate" is intended to include and embody the reaction products of higher molecular weight. Isobutane has been used almost exclusively because of its high reactivity and availability to produce the high quality alkylate product. In similar manner among the olefins butenes have been used almost exclusively. Propylene and the pentenes and even higher boiling olefinic feed stocks have been used according to their availability and the desires of those skilled in the art.

However, as is typical in most commercial chemical plants, the reaction between, e.g., isobutane and the butylene takes place in the presence of a large excess quantity of isobutane (10:1 $iC_4/C_4$ olefin molar ratio) in the reaction zone in order to significantly enhance the quality of the alkylate product. Accordingly, there is a large excess of isoparaffin hydrocarbon remaining in the effluent from the catalytic alkylation reaction zone. Therefore, it is desirable to recover and reuse the isoparaffin reactant in as high yield as possible and in as simple and economical manner as possible.

In like manner, propane which passes through the alkylation reaction zone unchanged and the small amount of propane which is produced from the reaction itself must also be removed from the alkylate product. The separation of the propane from isobutane is conveniently done in a depropanizer column since the deisobutanizer tower can only separate the isobutane from the normal butane in an expeditious manner. Thus the depropanizer column is normally of considerable size so that propane can be recovered in substantially pure form and $C_4$ hydrocarbons may be rejected from the bottom of the tower suitable for reuse for example in the alkylation reaction zone. Therefore, it is desirable to separate the propane or $C_3$ hydrocarbons from the $C_4$ hydrocarbons in as economical a manner as possible.

In practice, there have been numerous process schemes advanced by the prior art for accomplishing the alkylation reaction for recovery of the unreacted isoparaffin hydrocarbons, and for recovery of the $C_3$ hydrocarbons. Generally, the prior art has taken the hydrocarbon portion of the alkylation reaction zone effluent into what is commonly called a deisobutanizer tower or isostripper tower wherein an isobutane stream is recovered as an overhead fraction and the desired alkylate product is removed from the bottom of the tower. The difficulty with this practice is that the feed streams from normal refinery operations to an alkylation plant contain not only the desired reactants, isobutane and butylene, but also contain $C_2$ to $C_5$ hydrocarbons in various amounts. Therefore, the overhead stream from the deisobutanizer tower in a conventional alkylation plant not only contains isobutane but also contains at least the $C_3$ hydrocarbons which were in the feed. In order to make an economical separation of the $C_3$ and $C_4$ hydrocarbons the deisobutanizer tower, of necessity, must be of considerable height and also must contain extensive condensing and receiving equipment for the overhead streams. Typically, the prior art deisobutanizer tower is operated such that the desired isobutane fraction is condensed, and a vapor fraction containing $C_3$ hydrocarbons is removed from the overhead receiver for further processing in a depropanizer tower.

Accordingly, it is an object of the present invention to provide a fractionation scheme.

It is another object of this invention to provide an improved alkylation process for the recovery of isoparaffin reactants for reuse in the system and the recovery of the $C_3$ hydrocarbons.

It is a specific object of this invention to provide a fractionation scheme for the preparation of the feed stock to the depropanizer column operating in conjunction with an isobutane stripping column in a more facile and economical manner.

It is another specific object of this invention to provide a method for enriching the feed to the depropanizer column operating in conjunction with a deisobutanizer column.

As was previously noted, the feed stock to the conventional alkylation reaction preferably consists of isobutane and butylene. However, as will be more fully developed herein, the present invention encompasses a feed mixture containing $C_3$ and $C_4$ olefins as well as the $C_2$ to $C_5$ paraffins, but which will predominate generally in the $C_4$ hydrocarbons. In similar manner, the invention contemplates the use of any suitable catalytic material in addition to hydrofluoric acid such as sulfuric acid, mixtures of sulfuric and phosphoric acid, and certain complexes of aluminum chloride and sulfuric acid, etc.

Therefore, according to this invention, there is provided a method for separating a feed mixture comprising $C_3$ hydrocarbons, isobutane, and alkylate comprising the steps of: (a) introducing said mixture into the upper section of a first fractionation means maintained under fractionation conditions; (b) removing an overhead first vapor fraction comprising $C_3$ hydrocarbons and $C_4$ hydrocarbons; (c) withdrawing an upper sidecut vapor fraction comprising isobutane at a locus below the locus for introducing said feed mixture; (d) removing a bottoms fraction comprising alkylate; (e) partially condensing said first vapor fraction to produce a second vapor fraction enriched in $C_3$ hydrocarbons and a first liquid fraction enriched in $C_4$ hydrocarbons; (f) partially condensing said second vapor fraction to produce a third vapor fraction comprising $C_3$ hydrocarbons and a second liquid stream containing $C_4$ hydrocarbons; (g) passing said third vapor fraction into a second fractionation means maintained under fractionation conditions to produce a substantially pure $C_3$ product stream and a $C_4$ hydrocarbon stream, said conditions including reboiling said $C_4$ hydrocarbon stream by indirect heat exchange with hereinafter specified heating medium; (h) passing at least a portion of said upper sidecut vapor fraction of step (c) into indirect heat exchange with $C_4$ hydrocarbon stream to provide said second fractionation means reboiler heating medium as specified in step (g); and (i) recovering isobutane in high concentration.

Another embodiment of the present invention includes the method hereinabove wherein said feed mixture comprises the hydrocarbon effluent from an isobutane-olefin alkylation reaction zone.

A specific embodiment of this invention includes the method hereinabove wherein said olefin comprises butylenes and said upper sidecut vapor fraction is condensed and returned to said reaction zone.

Another specific embodiment of this invention includes the method hereinabove relating to the catalytic alkylation zone wherein a portion of said upper sidecut fraction is condensed by indirect heat exchange with air, said vapor fraction passed to the heat exchange in step (h) is substantially condensed thereby, and wherein said condensed isobutane, said first liquid stream, said second liquid stream, and said $C_4$ hydrocarbon stream from step (g) are returned to said reaction zone.

The object and advantages of this invention will be more clearly understood from the description presented hereinbelow with reference to the appended drawing which is a diagrammatic representation of apparatus for practicing one embodiment of the invention.

The description of the present invention will be limited to the processing scheme for handling the effluent from a conventional isoparaffin-olefin alkylation reaction zone; although, the scope of the invention is not necessarily to be limited thereto. The effluent is prepared by means well known to those skilled in the art and generally comprises the steps of comingling an olefin-containing feed stock with an isoparaffin-containing feed stock and then passing the mixture into a conventional alkylation reactor vessel. An isobutane-enriched paraffinic hydrocarbon stream is also added to the reaction zone in order that the isoparaffin-to-olefin ratio in the presence of the catalyst is at the proper level. Means for removing the heat of reaction from the reactor must also be provided and the contact time in the reactor is maintained for periods sufficient to intimately mix and contact the feed mixture with the catalyst so that the alkylation reaction can occur. The total effluent from the reaction zone is generally removed and passed into a separation means whereby the acid is separated from the hydrocarbon phase generally by settling. As used herein, the term "hydrocarbon effluent" is intended to embody solely the hydrocarbon phase which has been separated from the acid phase in such a settling zone. The acid phase is returned to the process in admixture with fresh acid, as needed, and the hydrocarbon phase as "hydrocarbon effluent" is further processed in accordance with the present invention.

Conventional alkylation conversion conditions of temperature, pressure, isoparaffin-olefin ratio, and hydrogen fluoride-hydrocarbon ratio can be employed advantageously in the reaction zone contemplated herein. For example, the alkylation of isobutane with butylenes can be carried out at temperatures between 0° F. and 150° F., preferably between 80° F. and 110° F., at pressures sufficiently high to keep the hydrocarbon and catalyst in liquid phase, and at isobutane-butylene mol ratios between 2:1 and 20:1, preferably between 10:1 and 15:1. Ratios of isobutane to butylene of at least 2:1 are essential since lower ratios tend to cause polymerization of the butylenes with a resulting decrease in yield of the desired alkylate product. The volume ratio of catalyst to hydrocarbon charge can also be varied considerably, e.g., the ratio of 1:1 to 10:1 can be used, preferably at least 2:1 is used. The acid catalyst charged to the reaction zone can be substantially anhydrous and can have a titratable acidity as low as 65% by weight, but preferably is maintained between 85% and 95% acidity.

When operating a hydrogen fluoride alkylation unit in the manner described generally hereinabove, utilizing the method of the present invention, an alkylate product having an end point below 400° F. a leaded octane (at 3 ccs. TEL/gal. of alkylate) of at least 105 is attained with a hydrogen fluoride catalyst consumption of less than 0.2 pound of catalyst per barrel produced. Additionally, as will be obvious from the general description of the present invention, significant economy of operation is achieved by the prior art.

Referring now to the appended drawing, the hydrocarbon effluent from a catalytic alkylation zone, substantially free from a major portion of catalyst, e.g., hydrogen fluoride, is pased into deisobutanizer stripper column 11 via line 10. The feed material contains propane, isobutane, n-butane, isopentane, n-pentane, and $C_5+$ hydrocarbons commonly called "alkylate." The alkylate stream is removed from column 11 via line 15 and is used for motor fuel blending or for other uses known to those skilled in the art. The alkylate may contain pentanes and sufficient $C_4$ hydrocarbons (n-butane) for proper vapor pressure control; although, for convenience, the alkylate product removed via line 15 will be referred to herein as $C_5+$ hydrocarbon material.

Typically, isostripper column 11 is a fractionation column 7 feet in diameter containing 55 trays spaced 24 inches apart. It operates at a pressure of less than 200 p.s.i.g., e.g., about 150 p.s.i.g., with a top temperature of about 145° F. and a bottoms temperature of about 350° F. It operates without external reflux. Preferably, isostripper 11 is fed near the middle of the vessel with a saturate n-butane stream (not shown). This saturate butane stream supplies isobutane to supplement that contained in the olefin-containing feed and supplies, if necessary, normal butane for proper vapor pressure control of the alkylate product. Excess n-butane is withdrawn as a lower sidecut vapor fraction via line 14 and leaves the system as a separate product.

Within isostripper 11 a substantial separation is made between the lower boiling isobutane, higher boiling n-butane, and the alkylation reaction product. A combination of isobutane flashing and alkylate stripping is accomplished therein. As set forth previously, the column has no external reflux and operates as a true stripper column. It is, therefore, no longer necessary to employ extremely costly reflux ratios to provide isobutane of high enough purity for recycle to the catalytic alkylation reaction zone. In addition, the n-butane present in the olefin feed to the alkylation unit plus the n-butane which is usually found in the outside isobutane stream plus the small amount of n-butane produced in the alkylation process itself, all must leave the system. Thus, if this n-butane were allowed to accumulate in the alkylate its vapor pressure would be extremely high and no control of the vapor pressure of the alkylate product could be exercised without the use of a subsequent stabilizing step. Normally, the alkylate is produced at a 7 pound Reid vapor pressure.

In the design of modern alkylation units vapor pressure control is achieved by withdrawing a vapor sidecut at the proper point (line 14) on the isostripper column 11 as hereinbefore set forth. The position of the withdrawal point is usually chosen so that the n-butane sidecut will contain less than about 5% isobutane and less than about 4% pentanes and still allow for some control of the vapor pressure of the product alkylate. An overhead product stream is withdrawn via line 12 and passed into partial condenser separator 16. Typically, the conditions maintained in condenser separator 16 are sufficient to produce a first vapor fraction in line 17 comprising $C_3$ and $C_4$ hydrocarbons and a first liquid fraction in line 18 containing primarily isobutane. The operating conditions in condenser-separator 16 include typically a temperature of approximately 130° F. and a pressure of approximately 145 p.s.i.g. Under these conditions, approximately 23% by volume of the feed mixture in line 12 remains a vapor and is removed via line 17. However, condenser, separator 16 may also be operated under a range of temperatures from 90° F. to 160° F. and pressures from 100 p.s.i.g. to 200 p.s.i.g. In the practice of this invention, the amount remaining vapor in line 17 may be from 5% to 50% by volume of the material in line 12.

Generally, the first vapor fraction in line 16 contains propane, isobutane, n-butane, and a small amount of isopentane. This material is passed via line 17 into second condenser-separator 19 wherein this first vapor fraction is again only partially condensed. A second vapor fraction is removed via line 20 and contains the major proportion of $C_3$ hydrocarbons for further processing in depropanizer tower 23. A second liquid fraction is removed from partial condenser-separator 19 via line 21 and, preferably, comingled with the material in line 18 to produce an isobutane-enriched stream in line 22 for further accumulation in accumulator 31 more fully discussed hereinbelow.

The conditions in partial condenser-separator 19 include a typical temperature of 110° F. and a typical pressure of about 135 p.s.i.g. wherein approximately 48% by volume of the material in line 17 remains a vapor and is removed via line 20 as hereinabove specified. A broad range of operating conditions for condenser-separator 19 applicable to the present invention include a temperature from 80° F. to 140° F., and pressures from 120 p.s.i.g. to 200 p.s.i.g. wherein from 10% to 50% by volume of the material in line 17 remains a vapor and is removed through line 20.

The material in line 20 includes primarily propane with small amounts of isobutane and n-butane remaining therein. In similar manner, the composition of the liquid in line 21 includes a small amount of propane and relatively larger amounts of isobutane and n-butane and an extremely small amount of isopentane.

At this point it should be noted that in the practice of this invention the removal of the $C_3$ hydrocarbons and a portion of the $C_4$ hydrocarbons by the two-stage partial condensing system allows the equipment for the overhead of the depropanizer column 23 discussed hereinbelow to be generally of reduced size.

The material in line 20 is passed into depropanizer column 23 wherein a substantially purified $C_3$ hydrocarbon stream is removed overhead via line 24 and a bottoms fraction comprising essentially $C_4$ hydrocarbons is removed via line 25 and a portion thereof completely removed from the processing sequence via line 26, e.g., for recycle to the reaction zone. However, in operating in accordance with the teachings of the present invention, a portion of the bottoms fraction from the bottom of depropanizer column 23 is passed via line 27 into reboiler 28 for the generation of heat input for fractionation to depropanizer column 23. As more fully discussed hereinbelow the heating medium driving the reboiler 28 comprises an isobutane-rich fraction removed from column 11 and condensed in reboiler 28. Reboiler 28 may be either external or internal to column 23 as is well known to those skilled in the art.

Depropanizer column 23 typically is a vessel four (4) feet in diameter containing 36 trays of perforated plates spaced 24 inches apart. This column preferably operates at a pressure of about 60 p.s.i.g. with a top temperature of about 30° F. and a bottoms temperature of less than 150° F., e.g., about 110° F. Since substantial quantities of $C_4$ hydrocarbons have been removed previous to this column the utility cost, e.g., heat requirements for reboiling are significantly less than would be required for conventional depropanizer towers operating outside the teachings of this invention. In some cases, the practice of the present invention may reduce the size of the depropanizer tower significantly.

Returning to deisobutanizer column 11, an upper sidecut vapor fraction comprising isobutane is removed from column 11 via line 13. A portion of this vapor fraction is passed via line 29 into reboiler 28 for the purpose of releasing sufficient heat therein to properly reboil depropanizer 23. The release of the heat in reboiler 28 substantially condenses the isobutane stream which is removed from reboiler 28 and passed via line 30 into accumulator-collector 31. Another portion of the vapor stream comprising isobutane is passed via line 32 into air condenser 33 for condensing of the stream to a liquid phase. The condensed isobutane stream leaves air condenser 33 and passes also into accumulator collector 31.

From the description of the invention presented hereinabove it can be seen that the method effects considerable economies of operation. In the first place, the recovery of the heat from the vaporized isobutane stream by driving the reboiler for the depropanizer column can save considerably on the heat requirements for the entire process. Additionally, the concept of removing the bulk of the isobutane present in the feed stream via a vapor fraction located below the feed locus in an air condenser effects considerable economies. Since the major portion of the cooling duty around the distillation train can be performed by air it is obvious that substantial saving in cooling requirements can be realized. The utility of a common collecting system 31 allows for the accumulation of all of the $C_4$ hydrocarbon streams which can be removed from the process via line 34 and, preferably, recycled to the catalytic alkylation zone for reaction therein.

The $C_3$ hydrocarbons removed via line 24 are recovered in substantially pure form and may eventually be used conveniently as household fuel or LPG gas. The description of the present invention is a method for separating normally gaseous hydrocarbons from the effluent of an isoparaffin-olefinn alkylation reaction zone. Inherently involved in the processing scheme, therefore, are conventional means for removing residual acid catalyst from the various streams as they are processed through the fractionation train. These conventional acid removal schemes have not been disclosed or discussed but are well known to those skilled in the art. Thus the present invention provides a novel method for preparing feed to depropanizer columns where substantially pure $C_3$ hydrocarbons are recovered from the system and $C_4$ hydrocarbons are also recovered for reuse in the system if desired.

The invention claimed:

1. Method for separating a feed mixture comprising $C_3$ hydrocarbons, isobutane, and alkylate which comprises the steps of:
   (a) introducing said mixture into the upper section of a first fractionation means maintained under fractionation conditions;

(b) removing an overhead first vapor fraction comprising $C_3$ hydrocarbons and $C_4$ hydrocarbons;
(c) withdrawing an upper side-cut vapor fraction comprising isobutane at a locus below the locus for introducing said feed mixture;
(d) removing a bottoms fraction comprising alkylate;
(e) partially condensing said first vapor fraction to produce a second vapor fraction enriched in $C_3$ hydrocarbons and a first liquid stream enriched in $C_4$ hydrocarbons;
(f) partially condensing said second vapor fraction to produce a third vapor fraction comprising $C_3$ hydrocarbons, and a second liquid stream containing $C_4$ hydrocarbons;
(g) passing said third vapor fraction into a second fractionation means maintained under fractionation conditions to produce a substantially pure $C_3$ product stream and a $C_4$ hydrocarbon stream, said conditions including reboiling said $C_4$ hydrocarbon stream by indirect heat exchange with hereinafter specified heating medium;
(h) passing at least a portion of said upper side-cut vapor fraction of step (c) into indirect heat exchange with said $C_4$ hydrocarbon stream to provide the said second fractionation means reboiler heating medium as specified in step (g), and,
(i) recovering a liquid fraction comprising isobutane.

2. Method according to claim 1 wherein said feed mixture comprises the hydrocarbon effluent from an isobutane-olefin alkylation reaction zone.

3. Method according to claim 2 wherein said olefin is selected from the group consisting of propylene, butylenes, amylenes, and a mixture comprising propylene and butylenes.

4. Method according to claim 2 wherein said olefin comprises butylenes, and said upper side-cut vapor fraction is condensed and returned to said reaction zone.

5. Method according to claim 4 wherein a portion of said upper side-cut vapor fraction is condensed by indirect heat exchange with air.

6. Method according to claim 2 wherein a portion of said upper side-cut vapor fraction is condensed by indirect heat exchange with air, said vapor portion passed to heat exchange in step (h) is substantially condensed thereby, and wherein said condensed isobutane, said first liquid stream, said second liquid stream, and said $C_4$ hydrocarbon stream from step (g) are returned to said reaction zone.

No references cited.

HERBERT LEVINE, *Primary Examiner.*